US012724975B1

(12) United States Patent
Cai et al.

(10) Patent No.: US 12,724,975 B1
(45) Date of Patent: Sep. 1, 2026

(54) TEXT GENERATION REFINEMENT

(71) Applicant: Amazon Technologies, Inc., Seattle, WA (US)

(72) Inventors: Jinglun Cai, Seattle, WA (US); Jie Yuan, Bellevue, WA (US); Monica Lakshmi Sunkara, San Francisco, CA (US); Hang Su, Redmond, WA (US); Saab Mansour, San Jose, CA (US); Igor Shalyminov, San Jose, CA (US); Katrin Kirchhoff, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 143 days.

(21) Appl. No.: 18/676,144

(22) Filed: May 28, 2024

(51) Int. Cl.
*G06F 40/30* (2020.01)
*G06F 16/3329* (2025.01)
*G06F 16/334* (2025.01)
*G06F 16/34* (2019.01)
*G06F 40/35* (2020.01)

(52) U.S. Cl.
CPC .......... *G06F 40/30* (2020.01); *G06F 16/3329* (2019.01); *G06F 16/3346* (2019.01); *G06F 16/345* (2019.01); *G06F 40/35* (2020.01)

(58) Field of Classification Search
None
See application file for complete search history.

(56) References Cited

U.S. PATENT DOCUMENTS 12,182,307 B1 * 12/2024 Li .......................... G06F 16/33
2014/0267045 A1 * 9/2014 Grieves ................ G06F 3/0237 704/10
2021/0192412 A1 * 6/2021 Krishnaswamy .......................... G06Q 10/06316
2022/0254331 A1 * 8/2022 Jafari ..................... G06F 9/547
2024/0073321 A1 * 2/2024 Can ..................... H04M 3/5235
2024/0289371 A1 * 8/2024 Martínez Galindo ...................... G06F 16/313
2024/0362903 A1 * 10/2024 Palatnik de Sousa . G06V 10/82
2025/0005298 A1 * 1/2025 Dingliwal .............. G06F 40/20
2025/0111169 A1 * 4/2025 Srinivasan .............. G06N 3/08
2025/0156634 A1 * 5/2025 Klafter ................. G06F 16/953

(Continued)

OTHER PUBLICATIONS

Jiang, Dongfu, Xiang Ren, and Bill Yuchen Lin. "Llm-blender: Ensembling large language models with pairwise ranking and generative fusion." arXiv preprint arXiv:2306.02561 (2023). (Year: 2023).*

(Continued)

*Primary Examiner* — Douglas Godbold
(74) *Attorney, Agent, or Firm* — Nicholson DeVos Webster & Elliott LLP

(57) ABSTRACT

Techniques for text generation refinement are described. In some examples, a predicted text output is generated, wherein the predicted text output is selected from a plurality of predicted texts generated in response to the request, wherein the generating comprises: predicting a plurality of predicted texts using at least one machine learning model, scoring each of the plurality of predicted texts using at least one of intra-sample scoring and inter-sample scoring, computing a composite score for each of the plurality of predicted texts from the scores, ranking the plurality of predicted texts based at least in part the composite score, and selecting at least a highest ranked predicted text of the plurality of predicted texts as the predicted text output.

20 Claims, 9 Drawing Sheets

(56) References Cited

U.S. PATENT DOCUMENTS

| | | | | |
|---|---|---|---|---|
| 2025/0166377 | A1* | 5/2025 | Wang | G06V 10/82 |
| 2025/0225329 | A1* | 7/2025 | Raghunathan | G06F 21/554 |
| 2025/0279191 | A1* | 9/2025 | Glover | G06F 40/216 |
| 2025/0284728 | A1* | 9/2025 | Monteiro | G06F 16/383 |
| 2025/0284878 | A1* | 9/2025 | Bahirwani | G06F 40/47 |
| 2025/0335706 | A1* | 10/2025 | Zadeh | G06F 40/20 |
| 2025/0335711 | A1* | 10/2025 | Wang | G10L 15/07 |
| 2025/0355912 | A1* | 11/2025 | Gupta | G06F 40/284 |

OTHER PUBLICATIONS

Aakanksha Chowdhery, et al., PaLM: Scaling Language Modeling with Pathways, Oct. 5, 2022, 1-87.

Afra Feyza Akyürek, et al., RL4F: Generating Natural Language Feedback with Reinforcement Learning for Repairing Model Outputs, Jul. 9, 2023, 7716-7733, https://aclanthology.org/2023.acl-long.427/.

Aman Madaan, et al., Self-Refine: Iterative Refinement with Self-Feedback, May 25, 2023, 1-54, https://doi.org/10.48550/ARXIV.2303.17651.

Ashwin K Vijayakumar, et al., Diverse Beam Search: Decoding Diverse Solutions From Neural Sequence Models, Oct. 7, 2016, 1-14.

Chin-Yew Lin, Rouge: A Package for Automatic Evaluation of Summaries, 74-81, 2004, https://aclanthology.org/W04-1013/.

Dongfu Jiang, et al., LLM-Blender: Ensembling Large Language Models with Pairwise Ranking and Generative Fusion, Jul. 9, 2023, 14165-14178, https://doi.org/10.18653/v1/2023.acl-long.792.

Fan Yin, et al., On the Sensitivity and Stability of Model Interpretations in NLP, May 22, 2022, 2631-2647, vol. 1., https://doi.org/10.18653/v1/2022.acl-long.188.

Giorgos Vernikos, et al., Small Language Models Improve Giants by Rewriting Their Outputs, May 22, 2023, 1-12, http://arxiv.org/abs/2305.13514.

Hugo Touvron, et al., Llama 2: Open Foundation and Fine-Tuned Chat Models, Jul. 19, 2023, 1-77.

Hunter Lang, et al., Co-training Improves Prompt-based Learning for Large Language Models, Jul. 1, 2022, 11985-12003, https://proceedings.mlr.press/v162/lang22a.html.

Jacob Devlin, et al., BERT: Pre-training of Deep Bidirectional Transformers for Language Understanding, Jun. 2, 2019, 4171-4186, https://doi.org/10.18653/V1/N19-1423.

Jason Cai et al., CERET: Cost-Effective Extrinsic Refinement for Text Generation, Nov. 4, 2024, 1-14.

Jason Wei, et al., Chain-of-Thought Prompting Elicits Reasoning in Large Language Models, 2022, 1-14, http://papers.nips.cc/paper_files/paper/2022/hash/9d5609613524ecf4f15af0f7b31abca4-Abstract-Conference.html.

Jianfeng He, et al., Semi-Supervised Dialogue Abstractive Summarization via High-Quality Pseudolabel Selection, Jun. 16, 2024, 5976-5996.

Jianfeng He, et al., Zero-Shot End-to-End Spoken Language Understanding via Cross-Modal Selective Self-Training, Mar. 17, 2024, 2239-2256, https://aclanthology.org/2024.eacl-long.137.

Jiaxin Ge, et al., Entailment as Robust Self-Learner, Jul. 9, 2023, 13803-13817.

Jiaxin Huang, et al., Large Language Models Can Self-Improve, Oct. 25, 2022, 1-19, https://doi.org/10.48550/ARXIV.2210.11610.

Jinglun Cai, et al., KG-ECO: Knowledge Graph Enhanced Entity Correction for Query Rewriting, Feb. 22, 2023, 1-5, https://doi.org/10.1109/ICASSP49357.2023.10096826.

Jinglun Cai, et al., Masked Audio Text Encoders are Effective Multi-Modal Rescorers, Jul. 9, 2023, 10718-10730.

Kenton Lee, et al., Latent Retrieval forWeakly Supervised Open Domain Question Answering, Jul. 28, 2019, 6086-6096, https://doi.org/10.18653/v1/P19-1612.

Liyan Xu, et al., Rescorebert: Discriminative Speech Recognition Rescoring With Bert, Feb. 18, 2022, 6117-6121, https://doi.org/10.1109/ICASSP43922.2022.9747118.

Lorenz Kuhn, et al., Semantic Uncertainty: Linguistic Invariances for Uncertainty Estimation in Natural Language Generation, May 1, 2023, 1-19, https://openreview.net/pdf?id=VD-AYtP0dve.

Lulu Zhao, et al., TODSum: Task-Oriented Dialogue Summarization with State Tracking, Oct. 25, 2021, 1-12, http://arxiv.org/abs/2110.12680.

Mandar Joshi, et al., TriviaQA: A Large Scale Distantly Supervised Challenge Dataset for Reading Comprehension, Jul. 30, 2017, 1601-1611, https://doi.org/10.18653/V1/P17-1147.

Markus Freitag, et al., High Quality Rather than High Model Probability: Minimum Bayes Risk Decoding with Neural Metrics, Aug. 1, 2022, 811-825, https://doi.org/10.1162/tacl_a_00491.

Mirac Suzgun, et al., Follow the Wisdom of the Crowd: Effective Text Generation via Minimum Bayes Risk Decoding, Jul. 9, 2023, 4265-4293, https://doi.org/10.18653/v1/2023.findings-acl.262.

Noah Shinn, et al., Reflexion: Language Agents with Verbal Reinforcement Learning, Oct. 10, 2023, 1-19, https://arxiv.org/abs/2303.11366.

Pawel Budzianowski, et al., MultiWOZ—A Large-Scale Multi-DomainWizard-of-Oz Dataset for Task-Oriented Dialogue Modelling, Oct. 31, 2018, 5016-5026, https://aclanthology.org/D18-1547/.

Pengcheng He, et al., Deberta: Decoding-Enhanced Bert With Disentangled Attention, Jan. 12, 2021, 1-21, https://openreview.net/forum?id=XPZIaotutsD.

Rohan Anil, et al., PaLM 2 Technical Report, Sep. 13, 2023, 1-93, https://arXiv preprint arXiv:2305.10403.

Shunyu Yao, et al., React: Synergizing Reasoning and Acting in Language Models, Feb. 1, 2023, 1-33, https://openreview.net/forum?id=WE_vluYUL-X.

Shunyu Yao, et al., Tree of Thoughts: Deliberate Problem Solving with Large Language Models, Dec. 3, 2023, 1-14, https://arxiv.org/pdf/2305.10601.

Siddhartha Jain, et al., Lightweight reranking for language model generations, Aug. 23, 2023, 1-17, https://doi.org/10.48550/ARXIV.2307.06857.

Tianyi Zhang, et al., Bertscore: Evaluating Text Generation With Bert, Apr. 26, 2020, 1-43, https://openreview.net/forum?id=SkeHuCVFDr.

Tom B. Brown, et al., Language Models are Few-Shot Learners, Jul. 22, 2020, 1-75.

Tom Kwiatkowski, et al., Natural Questions: A Benchmark for Question Answering Research, Jul. 1, 2019, 453-466, https://doi.org/10.1162/TACL_A_00276.

Wei-Lin Chiang, et al., Vicuna: An opensource chatbot impressing gpt-4 with 90%* chatgpt quality., Mar. 30, 2023, https://lmsys.org/blog/2023-03-30-vicuna/, Apr. 6, 2026.

Xuezhi Wang, et al., Self-Consistency Improves Chain of Thought Reasoning in Language Models, 2023, 1-24, https://openreview.net/pdf?id=1PL1NIMMrw.

Yao Yao, et al., Beyond Chain-of-Thought, Effective Graph-of-Thought Reasoning in Large Language Models, May 26, 2023, 1-22.

Yinhan Liu, et al., ROBERTa: A Robustly Optimized BERT Pretraining Approach, Jul. 26, 2019, 1-19, https://arxiv.org/pdf/1907.11692.

Yujie Xing, et al., Balancing Multi-Domain Corpora Learning for Open-Domain Response Generation, Jul. 10, 2022, 2104-2120, https://doi.org/10.18653/v1/2022.findings-naacl.162.

Yulong Chen, et al., Dialogsum: A Real-Life Scenario Dialogue Summarization Dataset, Aug. 1, 2021, 5062-5074, https://doi.org/10.18653/v1/2021.findings-acl.449.

Yuxia Wang, et al., Uncertainty Estimation and Reduction of Pre-trained Models for Text Regression, Jun. 1, 2022, 680-696, https://doi.org/10.1162/tacl_a_00483.

Zhengbao Jiang, et al., How Can We Know When Language Models Know? On the Calibration of Language Models for Question Answering, Sep. 1, 2021, 962-977, https://doi.org/10.1162/tacl_a_00407.

Zhibin Gou, et al., CRITIC: Large Language Models Can Self-Correct with Tool-Interactive Critiquing, May 19, 2023, 1-69.

* cited by examiner

TEXT GENERATION REFINEMENT

BACKGROUND

Large Language Models (LLMs) like generative pre-trained Transformer (GPT) models have showcased unprecedented capabilities in natural language understanding and generation. These models, with parameter counts reaching into the hundreds of billions, have become pivotal in advancing the frontier of natural language processing (NLP). Despite their impressive fluency and coherence, language models frequently generate content that is incomplete, biased, or misleading in their initial attempts across a variety of language generation tasks.

BRIEF DESCRIPTION OF DRAWINGS

Various examples in accordance with the present disclosure will be described with reference to the drawings, in which.

DETAILED DESCRIPTION

The present disclosure relates to methods, apparatus, systems, and non-transitory computer-readable storage media for refining generated text.

In text generation tasks such as abstractive summarization and open-ended question answering, language model-based systems may not produce good quality outputs in their first attempt. Apart from model fine-tuning, existing approaches to improve prediction accuracy and quality typically involve self-improvement/self-reflection methods that incorporate feedback from models themselves. Despite their effectiveness, these methods are hindered by their high computational cost and lack of scalability.

A challenge in improving text generation is that while pretraining equips base models with broad linguistic knowledge, it does not necessarily impart the specialized skills needed for particular downstream tasks. By integrating feedback derived from the generated outputs, self-improvement/self-reflection approaches enhance generations in an iterative manner.

Examples detailed herein describe approaches for refining text generations by considering one or more of semantic stability, entailment, and/or inter-sample uncertainty measures. Semantic stability scoring quantifies the linguistic invariance among multiple candidate outputs generated by the base model for the same input, indicating higher confidence for more stable candidates. Entailment scoring leverages natural language inference (NLI) models to quantify the logical entailment relations between candidate outputs, preferring candidates that maximally entail others. Inter-sample uncertainty scoring penalizes candidates that are semantically similar to outputs for different inputs, a signal of greater uncertainty.

Our approach operates in a rapid, zero-shot manner without any domain-specific training data, reward modeling, or human feedback. The proposed scoring and refinement process encapsulates an efficient way to improve text generation across a diverse spectrum of NLP tasks, including abstractive summarization, dialogue response generation, and open-domain question answering.

Figure 1:
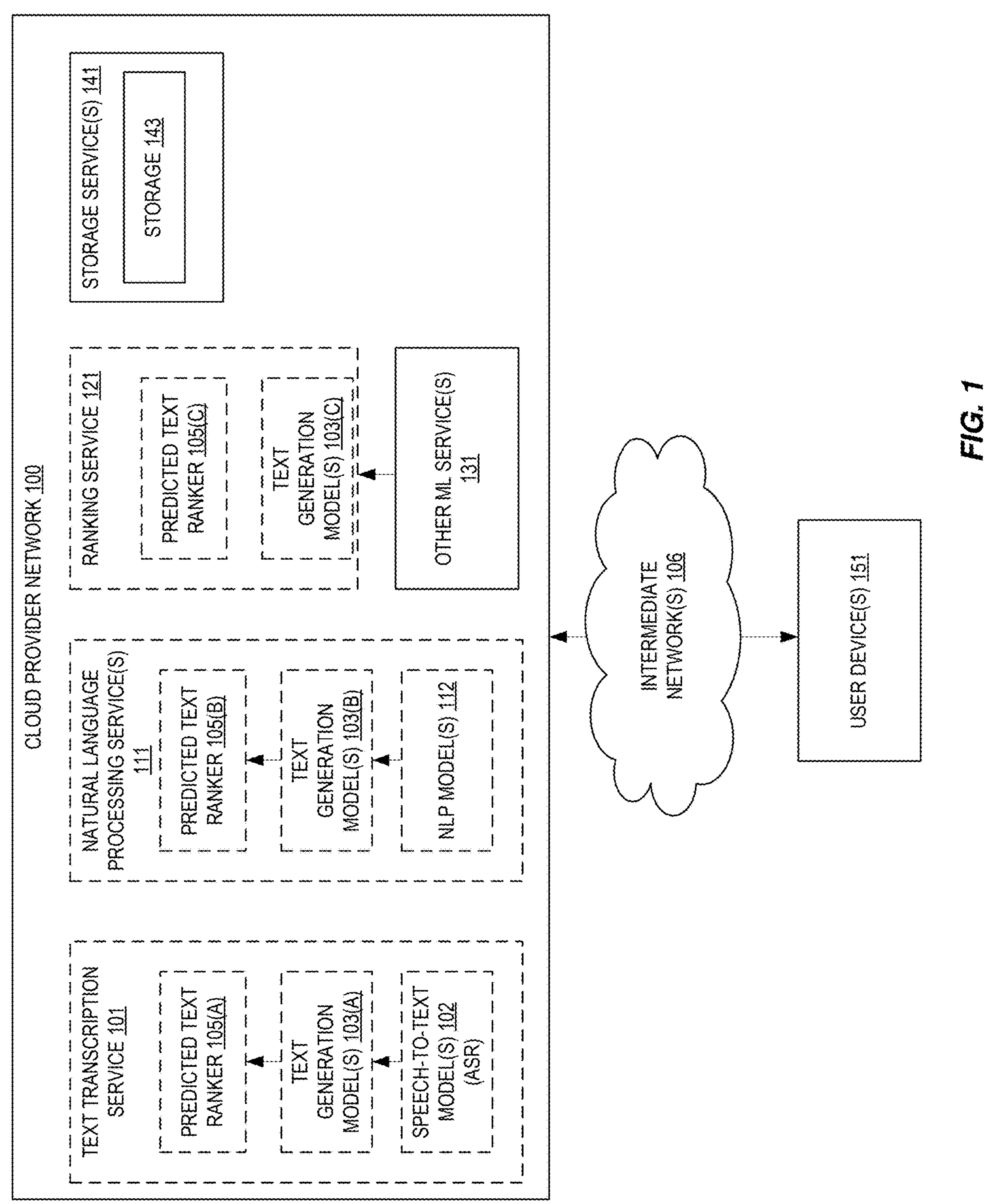
FIG. 1 illustrates examples that support refinement for generated text.

FIG. 1 illustrates examples that support refinement for generated text. This figure illustrates a cloud provider network 100 and one or more services that may be offered by the cloud provider network 100. These services may provide an ability to refine generated text by ranking output of one or more text generation models.

In some examples, a text transcription service 101 generates text from audio, video, etc. sources. One or more speech-to-text model(s) 102 (e.g., an automatic speech recognition (ASR) model) may be used to generate predicted text to be ranked. In some examples, the text transcription service 101 includes one or more separate text generation model(s) 103(A) to generate predicted text to be ranked. For example, one or more LLMs may be used to generate a summary of text predicted by an ASR model. In some examples, either the ASR or other text generation model(s) 103(A) is used to predict text to be ranked. A predicted text ranker 105(A) ranks output of the text generation model(s) 103(A) and/or speech-to-text model(s) 102. Typically, the highest ranked predicted text is selected to provide as output to a user. In some examples, a ranking service 121 is called by the text transcription service 101 to provide either text generation model(s) 103(C) and/or a predicted text ranker 105(C).

In some examples, a natural language processing (NLP) service 111 generates text from audio, video, etc. sources. One or more NLP models 112 may be used to generate predicted text to be ranked. In some examples, the NLP service 111 includes one or more separate text generation model(s) 103(B) to generate predicted text to be ranked. For example, one or more LLMs may be used to generate a summary of text predicted by an ASR model. In some examples, either the NLP model(s) 112 or other text generation model(s) 103(B) is used to predict text to be ranked. A predicted text ranker 105(B) ranks output of the text generation model(s) 103(B) and/or NLP model(s) 112. Typically, the highest ranked predicted text is selected to provide as output to a user. In some examples, a ranking service 121 is called by the NLP service 111 to provide either text generation model(s) 103(C) and/or a predicted text ranker 105(C).

In some examples, a ranking service 121 ranks predicted text. One or more text generation model(s) 103(C) is used to predict text to be ranked. A predicted text ranker 105(C) ranks output of the text generation model(s) 103(C). Typically, the highest ranked predicted text is selected to provide as output to a user. In some examples, the ranking service 121 is called by the other ML services 131, text transcription service 101, NLP service(s) 111, etc. to provide text to rank. Other ML services 131 may include, for example, business intelligence services, chatbot services, etc.

In some examples, one or more storage service(s) 141 use storage 143 to store text, images, video, audio, etc. that is to have text generated thereof.

A cloud provider network 100 (also referred to herein as a provider network, service provider network, etc.) provides users with the ability to use one or more of a variety of types of computing-related resources such as compute resources (e.g., executing virtual machine (VM) instances and/or containers, executing batch jobs, executing code without provisioning servers), data/storage resources (e.g., object storage, block-level storage, data archival storage, databases and database tables, etc.), network-related resources (e.g., configuring virtual networks including groups of compute resources, content delivery networks (CDNs), Domain Name Service (DNS)), application resources (e.g., databases, application build/deployment services), access policies or roles, identity policies or roles, machine images, routers and other data processing resources, etc. These and other computing resources can be provided as services, such as a hardware virtualization service that can execute compute instances, a storage service that can store data objects, etc. The users (or "customers") of cloud provider networks 100 can use one or more user accounts that are associated with a customer account, though these terms can be used somewhat interchangeably depending upon the context of use. Cloud provider networks are sometimes "multi-tenant" as they can provide services to multiple different customers using the same physical computing infrastructure; for example, virtual machine instances may be concurrently hosted for different customers using a same underlying physical host computing device.

Users can interact using user device(s) 151 with a cloud provider network 100 across one or more intermediate networks 106 (e.g., the internet) via one or more interface(s), such as through use of application programming interface (API) calls, via a console implemented as a website or application, etc. An API refers to an interface and/or communication protocol between a client and a server, such that if the client makes a request in a predefined format, the client should receive a response in a specific format or initiate a defined action. In the cloud provider network context, APIs provide a gateway for customers to access cloud infrastructure by allowing customers to obtain data from or cause actions within the cloud provider network, enabling the development of applications that interact with resources and services hosted in the cloud provider network. APIs can also enable different services of the cloud provider network to exchange data with one another. The interface(s) can be part of, or serve as a front-end to, a control plane of the cloud provider network 100 that includes "backend" services supporting and enabling the services that can be more directly offered to customers.

Thus, a cloud provider network (or just "cloud") typically refers to a large pool of accessible virtualized computing resources (such as compute, storage, and networking resources, applications, and services). A cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

A cloud provider network can be formed as a number of regions, where a region is a geographical area in which the cloud provider clusters data centers. Each region includes multiple (e.g., two or more) availability zones (AZs) connected to one another via a private high-speed network, for example a fiber communication connection. An AZ (also known as a "zone") provides an isolated failure domain including one or more data center facilities with separate power, separate networking, and separate cooling from those in another AZ. A data center refers to a physical building or enclosure that houses and provides power and cooling to servers of the cloud provider network. Preferably, AZs within a region are positioned far enough away from one another so that a natural disaster (or other failure-inducing event) should not affect or take more than one AZ offline at the same time.

Users can connect to an AZ of the cloud provider network via a publicly accessible network (e.g., the Internet, a cellular communication network), e.g., by way of a transit center (TC). TCs are the primary backbone locations linking users to the cloud provider network and can be collocated at other network provider facilities (e.g., Internet service providers (ISPs), telecommunications providers) and securely connected (e.g., via a VPN or direct connection) to the AZs. Each region can operate two or more TCs for redundancy. Regions are connected to a global network which includes private networking infrastructure (e.g., fiber connections controlled by the cloud provider) connecting each region to at least one other region. The cloud provider network can deliver content from points of presence (or "POPs") outside of, but networked with, these regions by way of edge locations and regional edge cache servers. This compartmentalization and geographic distribution of computing hardware enables the cloud provider network to provide low-latency resource access to users on a global scale with a high degree of fault tolerance and stability.

To provide these and other computing resource services, cloud provider networks 100 often rely upon virtualization techniques. For example, virtualization technologies can provide users the ability to control or use compute resources (e.g., a "compute instance," such as a VM using a guest operating system (O/S) that operates using a hypervisor that might or might not further operate on top of an underlying host O/S, a container that might or might not operate in a VM, a compute instance that can execute on "bare metal" hardware without an underlying hypervisor), where one or multiple compute resources can be implemented using a single electronic device. Thus, a user can directly use a compute resource (e.g., provided by a hardware virtualization service) hosted by the provider network to perform a variety of computing tasks. Additionally, or alternatively, a user can indirectly use a compute resource by submitting code to be executed by the provider network (e.g., via an on-demand code execution service), which in turn uses one or more compute resources to execute the code—typically without the user having any control of or knowledge of the underlying compute instance(s) involved.

As described herein, one type of service that a provider network may provide may be referred to as a "managed compute service" that executes code or provides computing resources for its users in a managed configuration. Examples of managed compute services include, for example, an on-demand code execution service, a hardware virtualization service, a container service, or the like.

An on-demand code execution service (referred to in various examples as a function compute service, functions service, cloud functions service, functions as a service, or serverless computing service) can enable users of the cloud provider network 100 to execute their code on cloud resources without having to select or manage the underlying hardware resources used to execute the code. For example, a user can use an on-demand code execution service by uploading their code and use one or more APIs to request that the service identify, provision, and manage any resources required to run the code. Thus, in various examples, a "serverless" function can include code provided by a user or other entity—such as the provider network itself—that can be executed on demand. Serverless functions can be maintained within the provider network by an on-demand code execution service and can be associated with a particular user or account or can be generally accessible to multiple users/accounts. A serverless function can be associated with a Uniform Resource Locator (URL), Uniform Resource Identifier (URI), or other reference, which can be used to invoke the serverless function. A serverless function can be executed by a compute resource, such as a virtual machine, container, etc., when triggered or invoked. In some examples, a serverless function can be invoked through an application programming interface (API) call or a specially formatted HyperText Transport Protocol (HTTP) request message. Accordingly, users can define serverless functions that can be executed on demand, without requiring the user to maintain dedicated infrastructure to execute the serverless function. Instead, the serverless functions can be executed on demand using resources maintained by the cloud provider network 100. In some examples, these resources can be maintained in a "ready" state (e.g., having a pre-initialized runtime environment configured to execute the serverless functions), allowing the serverless functions to be executed in near real-time.

Figure 2:
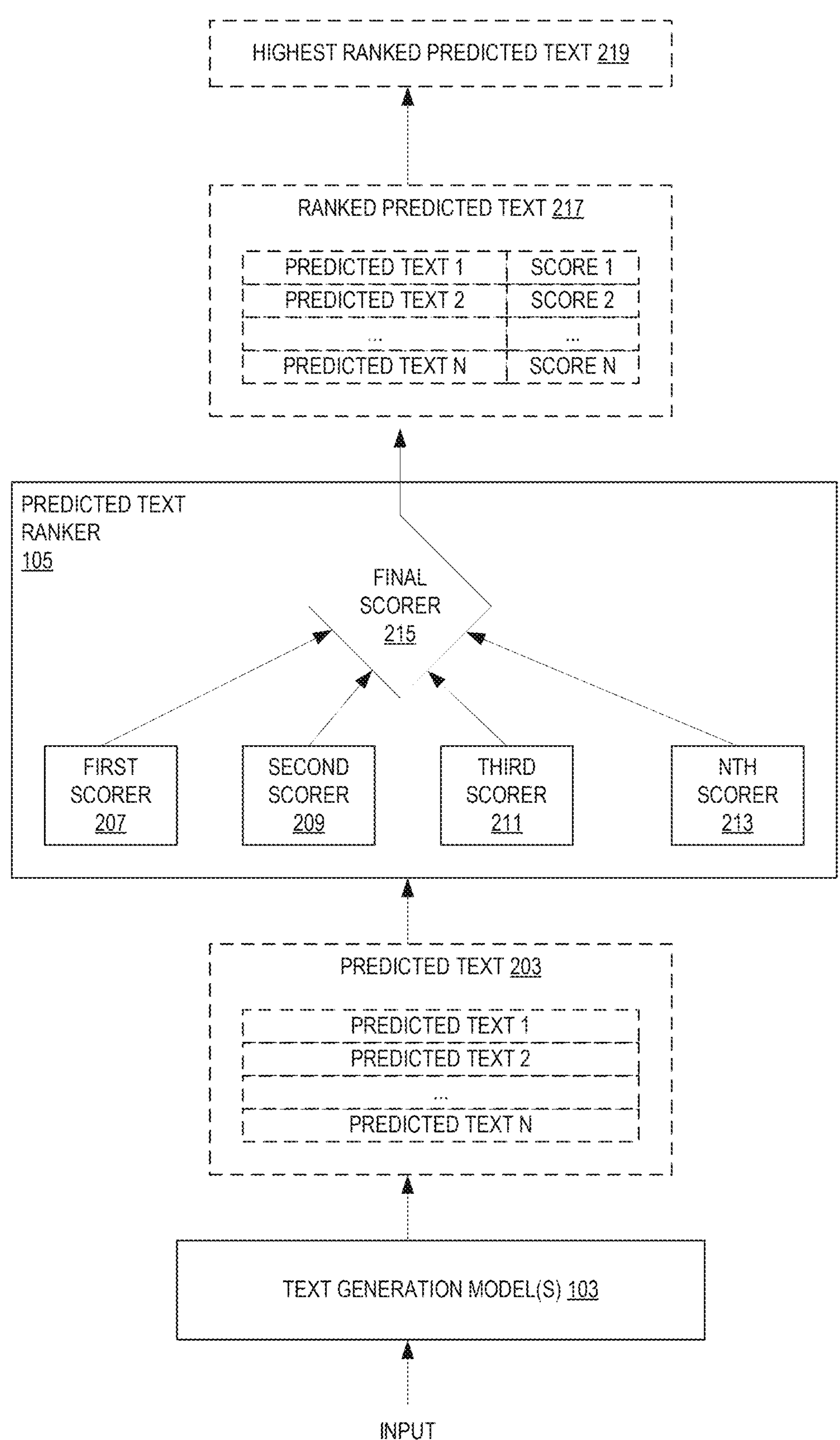
FIG. 2 illustrates examples of one or more systems for generated text refinement.

FIG. 2 illustrates examples of one or more systems for generated text refinement. Some input is provided to one or more text generation machine learning models 103. For example, one or more large language models (LLMs) may receive input to predict text on. The text generation may be in response to a prompt such as to summarize a picture, text, audio, etc. Other text generation prompts and/or data input types may be used.

The output of the one or more models 103 is predicted text 203. Note that for the same input multiple predicted texts are generated. This set of predicted text 203 should be diverse. Note that the same model may be used multiple times, a plurality of models used, or a combination thereof.

The predicted text 203 is then subjected to a plurality of scorers. Examples of a first scorer 207, a second scorer 209, and a third scorer 211 are detailed below. These examples are illustrative in nature. Other scores may be used in some examples (e.g., Nth scorer 213) and not all of the scorers are used in some examples.

Each individual scorer produces a separate score from a particular perspective. Based on the scores in multiple dimensions, a final confidence score is computed by final scorer 215 to measure the quality of each prediction and the predicted text is ranked 217 by the final confidence scores. The prediction with the highest confidence score 219 is selected as the final model prediction. In some examples, the final scorer 215 and scorers form a predicted text ranker 105.

Figure 3:
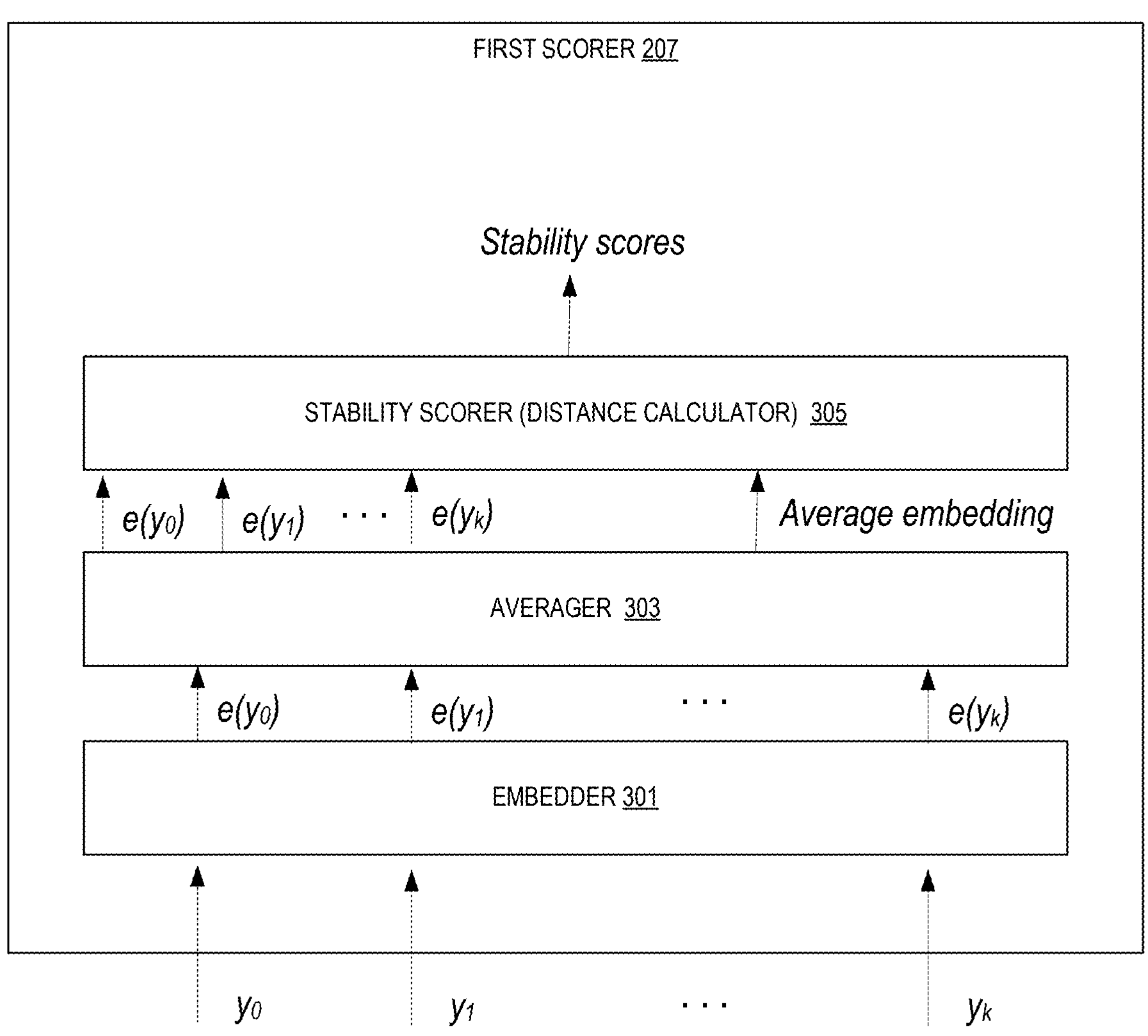
FIG. 3 illustrates examples of a first scorer.

FIG. 3 illustrates examples of a first scorer. In some examples, the illustration is representative of the first scorer 207. This scorer utilizes an intrasample scoring method of semantic stability scoring. The use of semantic stability scoring may enhance the confidence and reliability of sample generations produced by text generation model(s) 103.

For a given input data sample x, the text generation model(s) 103 generate(s) k predictions ($y_1, \ldots, y_k$). For each prediction $y_i$, an embedder 301 (e.g., a pretrained language model such as a Robustly Optimized BERT Pretraining Approach (RoBERTa) model produces its corresponding embedding $e(y_i)$. In some examples, other models (e.g., other Transformer-based models) are used as embedders. In some examples, a final hidden representation of "<s>" token from RoBERTa is regarded as $e(y_i)$.

To aggregate all intra-sample representations, an average-pooled embedding e is calculated using average 303 as a stability reference point:

$$\overline{e} = \text{mean}(e(y_1), \ldots, e(y_k))$$

A lower distance between an embedding and the reference point implies a higher stability. A distance metric $\|\cdot\|$ (e.g., Euclidean distance or cosine distance) is applied to calculate a distance per embedding to the reference point. A stability score $$s^i_{sta}$$

is calculated by stability scorer (e.g., a distance calculator) 305 as the negative distance between $e(y_i)$ and the stability reference point $\overline{e}$:

$$s^i_{sta} = -\|e(y_i) - \overline{e}\|$$

Figure 4:
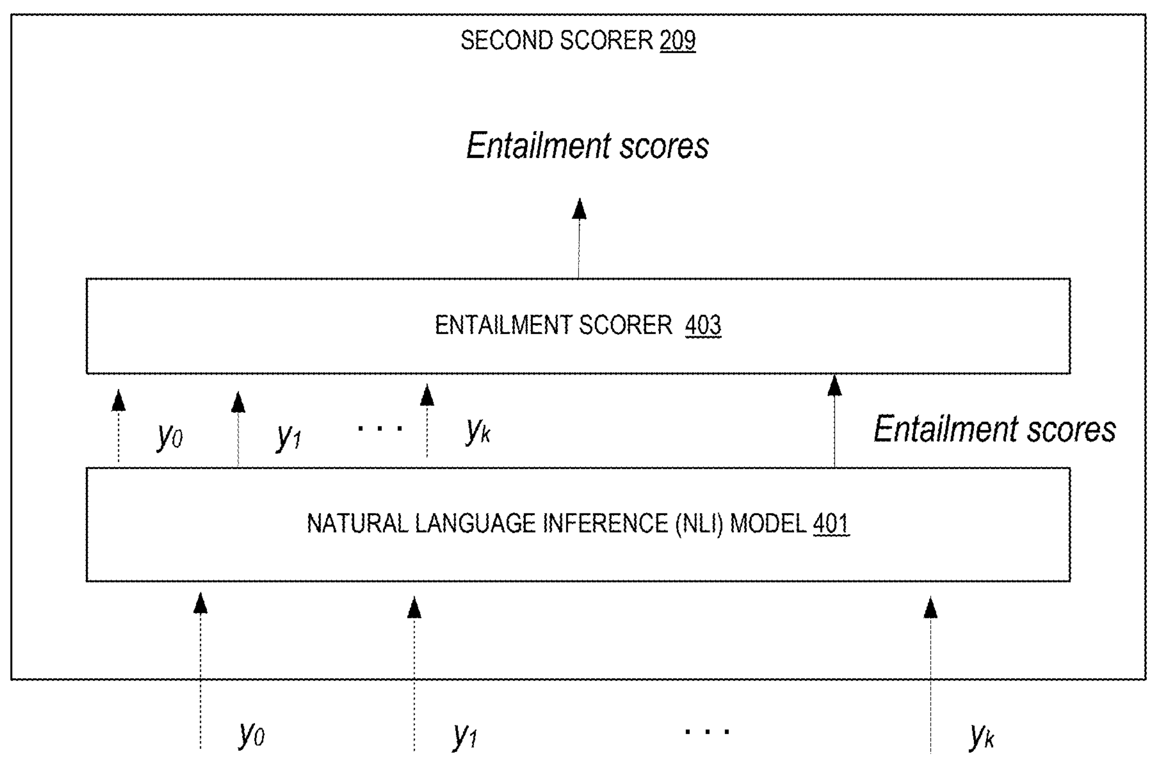
FIG. 4 illustrates examples of a second scorer.

FIG. 4 illustrates examples of a second scorer. In some examples, the illustration is representative of the second scorer 209. This scorer performs an entailment scoring. Entailment scoring is another intra-sample scoring method, fully powered by the entailment relation "p entails h" (p⇒h) if a human reading premise p would infer that hypothesis h is most likely true. This intrinsic connection to human inference aligns closely with the objective that text predicting models should have the capacity to generate content that is not only syntactically accurate, but also semantically meaningful. In the entailment scoring process, when a text generation model 103 generates k predictions ($y_1, \ldots, y_k$) each prediction's entailment relation to others is quantified by a Natural Language Inference (NLI) model 401. A scalar value $$s^i_j$$

reflects the degree to which the content of $y_i$ logically entails $y_j$:

$$s^i_j = ENT(y_i, y_j)$$

In some examples, the scalar function for entailment is evaluated by the text generation model 103 itself. In some examples, a different model is used for NLI. For example, a Transformer-based model such as DeBERTa (Decoding-enhanced BERT with disentangled attention) may be used. In some examples, the NLI task is treated as a sequence classification problem. Predicted texts ($y_i$, $y_j$) are concatenated, with special tokens as separators, to form the input to the NLI model 401. In some examples, a final hidden representation of the NLI model 401 is passed to a pooling layer and a classifier to obtain softmax probability for one or more categories (e.g., Neutral, Entailment and Contradiction). The softmax probability for entailment is used as $ENT(y_i, y_j)$.

A text generation is plausible if it entails as many other sampled generations as possible. With the top k sampled model predictions, the entailment score for sample $y_i$ is computed by the entailment scorer 403 as follows:

$$s_{ent}^i = \frac{1}{k} \sum_{1 \le j \ne \le k} s_j^i + LP(y_i)$$

In some examples, a preferred prediction has rich information and may be lengthy. In some examples, a length penalty $LP(y_i)$ is applied to this entailment score.

$$LP(y_i) = 1 - (1 + q \cdot len(y_i))^p$$

Where $0 \le q < 1$ and $p > 1$ are hyperparameters.

Figure 5:
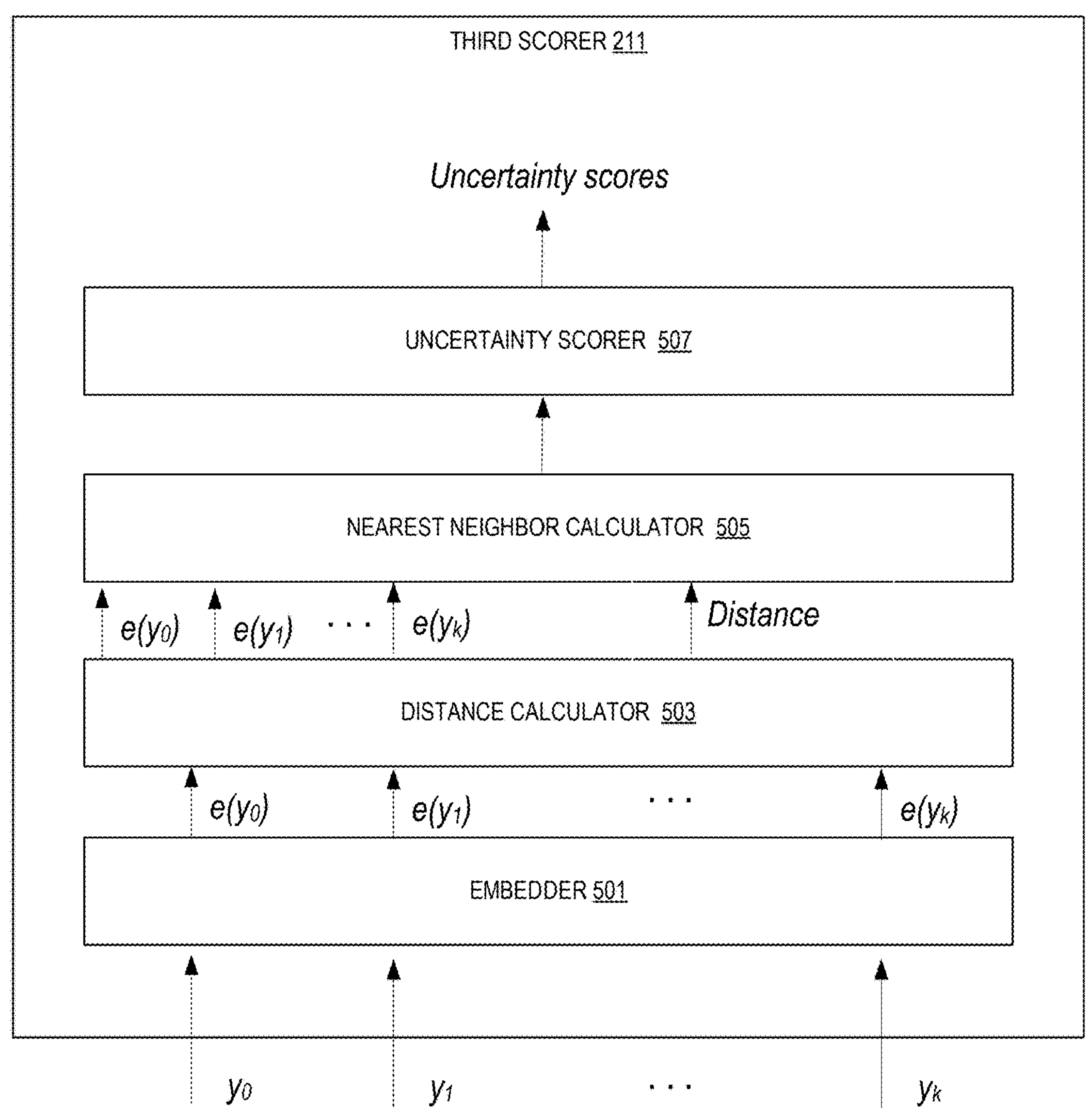
FIG. 5 illustrates examples of a third scorer.

FIG. 5 illustrates examples of a third scorer. In some examples, the illustration is representative of the third scorer 211. The third score applies an inter-sample scoring method. An embedder 501 builds an embedding space for all sampled predictions. In some examples, the embedder 501 is Transformer-based model (e.g., RoBERTa). When a sampled prediction is located near predictions from different input data samples in the embedding space this prediction is likely to be uncertain. Uncertain predictions can be down-weighted by a lower uncertainty score $s_{unc}$.

Suppose a dataset D has size N. For each input x, top k predictions are generated by text generation model(s) 103 resulting in k·N predictions in total: $\{y_i\}1 \le i \le kN$. The Euclidean distance of all possible embedding prediction pairs $\|e(y_i)-e(y_j)\|$, $i \ne j$ are computed by distance calculator 503. According to Euclidean distance, the nearest neighbor set $\mathcal{N}(i)$ is constructed for each prediction embedding $e(y_i)$ using nearest neighbor calculator 505. The inter-sample uncertainty score $$s_{unc}^i$$

is computed by an uncertainty scorer 507 as follows:

$$s_{unc}^i = -\sum_{j \in \mathcal{N}(i)} \frac{\mathbb{1}(\hat{x}_i \ne \hat{x}_j)}{(1 + \|e(y_i) - e(y_j)\|)}$$

where $\mathbb{1}(\cdot)$ is the indicator function. $\hat{x}_i$ denotes the input sample x for the embedding for prediction $y_i$. Note that possibly $\hat{x}_j = \hat{x}_i$ when $i \ne j$. $\|e(y_i)-e(y_j)\|$ in denominator is a regularization term, ensuring a further $e(y_j)$ is assigned with a lower weight for uncertainty. A negative sign is added to ensure that a higher score is better. When the dataset is large, the computation cost for obtaining pairwise Euclidean distances and nearest neighbors can be mitigated by limiting data size N to a certain batch (e.g., 1,000).

The separate scores $s_{sta}$, $s_{ent}$, $s_{unc}$ (if all used and any additional scores generated by other scorers such as Nth scorer 213) are transformed to the interval (0,1) by applying sigmoid function $$sigmoid(x) = \frac{1}{1 + e^{-ux}}$$

where u>0 is an additional scaling factor by the final scorer 215 in some examples. Since the scores may have distinct ranges u is applied to ensure their scaled ranges are comparable. The final confidence score is a linear weighted score based on three dimensions.

$$s = \alpha \cdot s_{sta} + \beta \cdot s_{ent} + \gamma \cdot s_{unc}$$

The coefficients a, β, γ may tuned on validation datasets. To mimic the properties of probability for intuitive interpretation, the following constraints are imposed in some examples:

$$\begin{cases} a + \beta + \gamma = 1 \\ a, \beta, \gamma \ge 0 \end{cases}$$

Figure 6:
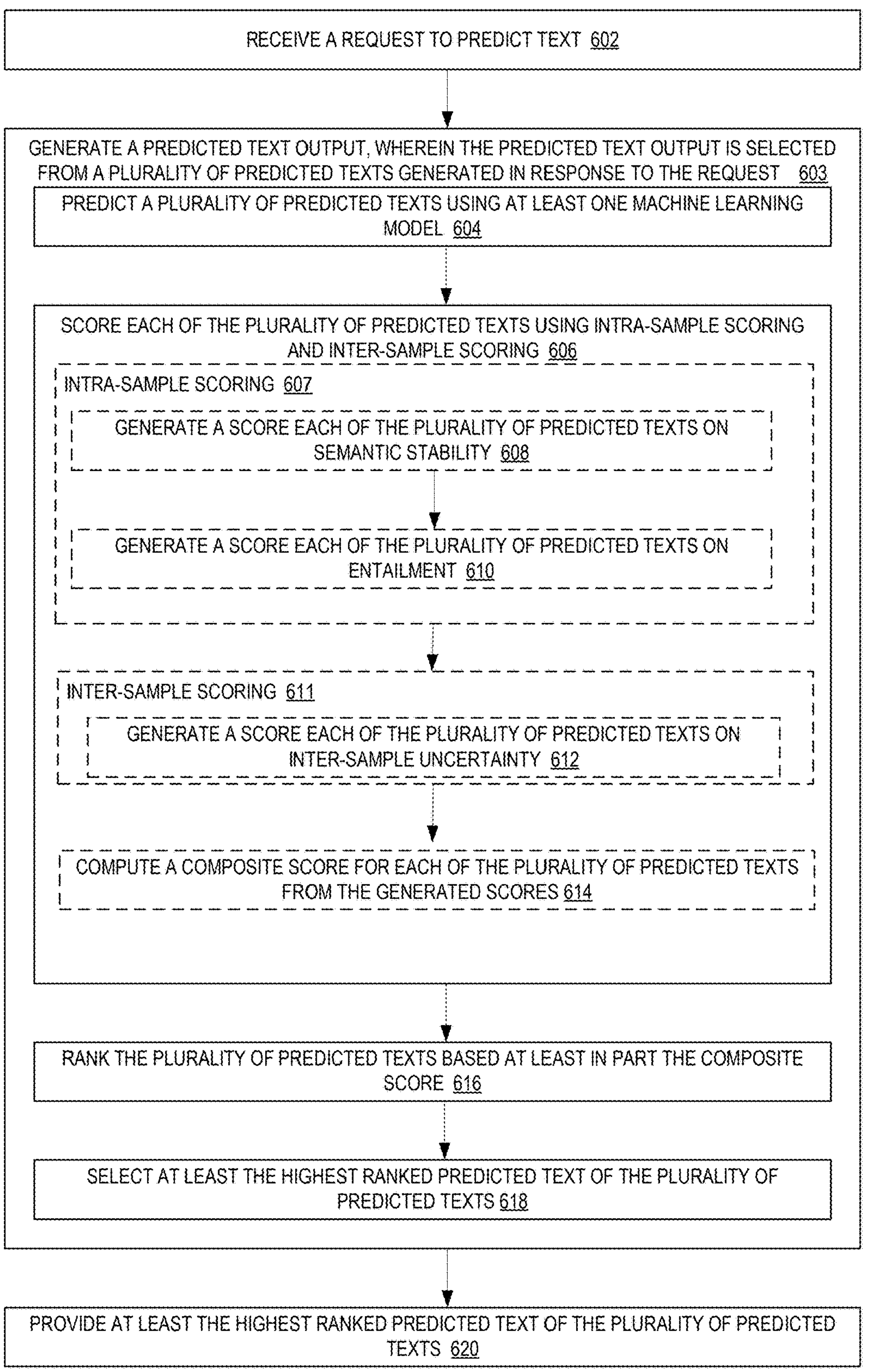
FIG. 6 is a flow diagram illustrating operations of a method for generating predicted text output according to some examples.

FIG. 6 is a flow diagram illustrating operations of a method for generating predicted text output according to some examples. Some or all of the operations (or other processes described herein, or variations, and/or combinations thereof) are performed under the control of one or more computing devices configured with executable instructions, and are implemented as code (e.g., executable instructions, one or more computer programs, or one or more applications) executing collectively on one or more processors. The code is stored on a computer-readable storage medium, for example, in the form of a computer program comprising instructions executable by one or more processors. The computer-readable storage medium is non-transitory. In some examples, one or more (or all) of the operations are performed by at least the text generation model(s) 103 and/or predicted text ranker 105 of the other figures.

In some examples, a request to predict text is received at 602. In some examples, the request includes one or more of: a textual prompt, a visual prompt, an audio prompt, an audio/visual prompt, an indication of a model to use to predict text, an indication of a number of times to use the model to predict text, an indication of a number of models to use to predict text, an indication of a number of results to provide in response to the request, an indication of a location of at least one file to use in the text prediction, at least one file to use in the text prediction, etc. The request could come from a number of sources. For example, a request may come from a user (e.g., using a user device 151), a text transcription service 101, an NLP service 111, a summarization service 121, or other services 121 such as a business intelligence service, etc. The request is a request for a summary in some examples.

A plurality of predicted texts is generated using at least one machine learning model at 604. In some examples, a machine learning model is used multiple times (e.g., by using beam search sampling which may include changing one or more of a beam width, greedy sampling, and/or a temperature, etc.). In some examples, the temperature is changed for each request. In some examples, a greedy search is used to generate predicted text. In some examples, a plurality of machine learning models is used to predict text. In some examples, sampling of the input is used to generate predicted text.

Each of the plurality of predicted texts is scored at 606 using intra-sample scoring 607 and/or inter-sample scoring at 611.

A type of intra-sample scoring that is performed in some examples is a semantic stability scoring. In some examples, a semantic stability score is generated for each of the plurality of predicted texts on semantic stability at 608. Examples of semantic stability scoring have been detailed above.

A type of intra-sample scoring that is performed in some examples is an entailment scoring. In some examples, a score for each of the plurality of predicted texts is generated for entailment at 610. Examples of entailment scoring have been detailed above.

A type of inter-sample scoring that is performed in some examples is an uncertainty scoring. In some examples, a score of each of the plurality of predicted texts is generated by inter-sample uncertainty scoring at 612. Examples of uncertainty scoring have been detailed above.

A composite score for each of the plurality of predicted texts is computed from the generated scores at 614. This composite (or final) score may include some normalization.

The plurality of predicted texts is ranked based at least in part on their respective composite scores at 616.

At least the highest ranked predicted text of the plurality of predicted texts is selected to be the predicted text output at 618. The predicted text output is provided at 620. Note that the output may be a plurality of predicted texts depending on the request and configuration of the predicted output mechanisms.

Figure 7:
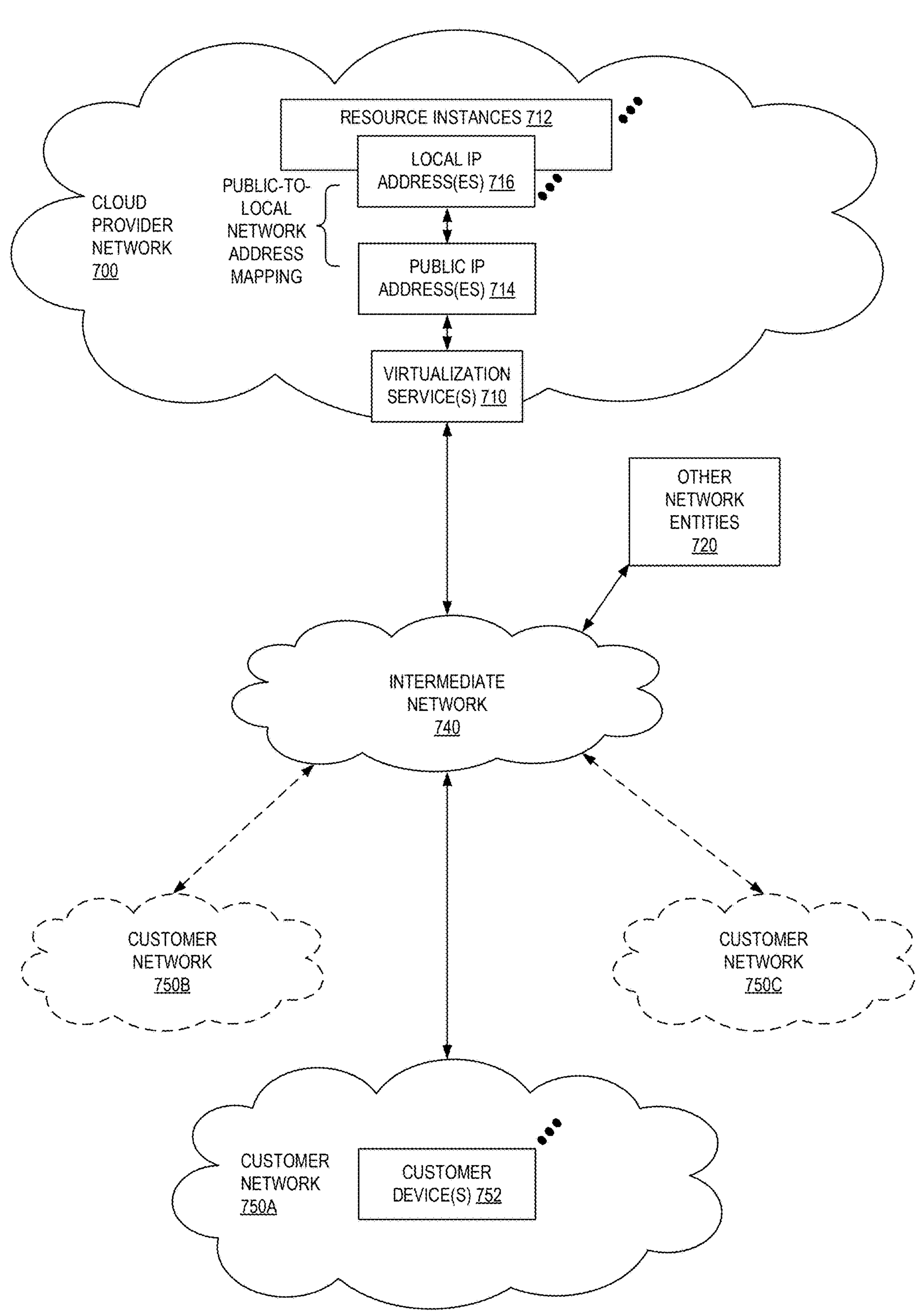
FIG. 7 illustrates an example cloud provider network environment according to some examples.

FIG. 7 illustrates an example provider network (or "service provider system") environment according to some examples. A provider network 700 can provide resource virtualization to customers via one or more virtualization services 710 that allow customers to purchase, rent, or otherwise obtain instances 712 of virtualized resources, including but not limited to computation and storage resources, implemented on devices within the provider network or networks in one or more data centers. Local Internet Protocol (IP) addresses 716 can be associated with the resource instances 712; the local IP addresses are the internal network addresses of the resource instances 712 on the provider network 700. In some examples, the provider network 700 can also provide public IP addresses 714 and/or public IP address ranges (e.g., Internet Protocol version 4 (IPv4) or Internet Protocol version 6 (IPv6) addresses) that customers can obtain from the provider 700.

Conventionally, the provider network 700, via the virtualization services 710, can allow a customer of the service provider (e.g., a customer that operates one or more customer networks 750A-750C (or "client networks") including one or more customer device(s) 752) to dynamically associate at least some public IP addresses 714 assigned or allocated to the customer with particular resource instances 712 assigned to the customer. The provider network 700 can also allow the customer to remap a public IP address 714, previously mapped to one virtualized computing resource instance 712 allocated to the customer, to another virtualized computing resource instance 712 that is also allocated to the customer. Using the virtualized computing resource instances 712 and public IP addresses 714 provided by the service provider, a customer of the service provider such as the operator of the customer network(s) 750A-750C can, for example, implement customer-specific applications and present the customer's applications on an intermediate network 740, such as the Internet. Other network entities 720 on the intermediate network 740 can then generate traffic to a destination public IP address 714 published by the customer network(s) 750A-750C; the traffic is routed to the service provider data center, and at the data center is routed, via a network substrate, to the local IP address 716 of the virtualized computing resource instance 712 currently mapped to the destination public IP address 714. Similarly, response traffic from the virtualized computing resource instance 712 can be routed via the network substrate back onto the intermediate network 740 to the source entity 720.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193 and can be mutable within the provider network. Network traffic originating outside the provider network is not directly routed to local IP addresses; instead, the traffic uses public IP addresses that are mapped to the local IP addresses of the resource instances. The provider network can include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses can be assigned by the provider network infrastructure to particular resource instances; these public IP addresses can be referred to as standard public IP addresses, or simply standard IP addresses. In some examples, the mapping of a standard IP address to a local IP address of a resource instance is the default launch configuration for all resource instance types.

At least some public IP addresses can be allocated to or obtained by customers of the provider network 700; a customer can then assign their allocated public IP addresses to particular resource instances allocated to the customer. These public IP addresses can be referred to as customer public IP addresses, or simply customer IP addresses. Instead of being assigned by the provider network 700 to resource instances as in the case of standard IP addresses, customer IP addresses can be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 8:
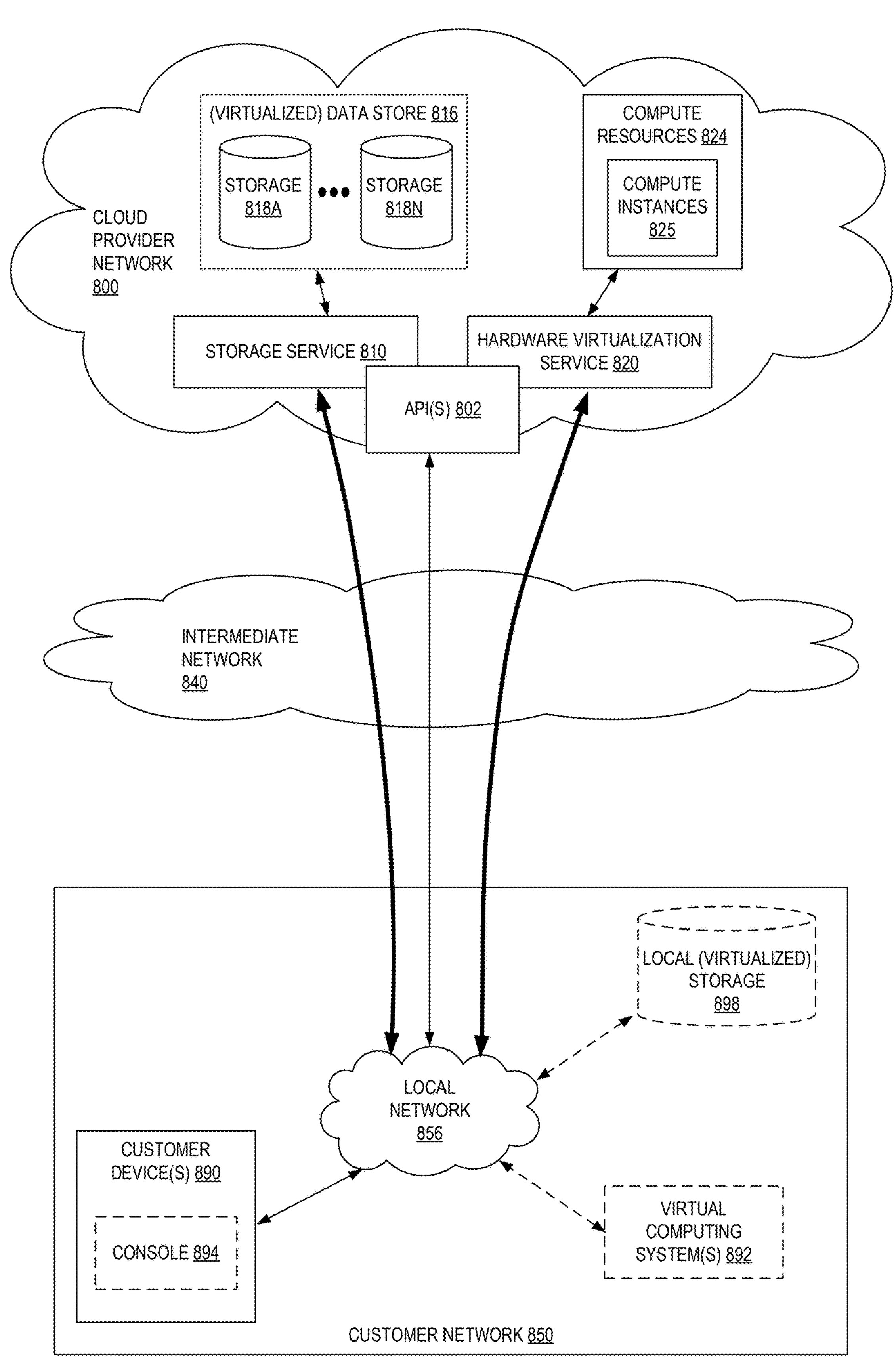
FIG. 8 is a block diagram of an example cloud provider network that provides a storage service and a hardware virtualization service to customers according to some examples.

FIG. 8 is a block diagram of an example provider network environment that provides a storage service and a hardware virtualization service to customers, according to some examples. A hardware virtualization service 820 provides multiple compute resources 824 (e.g., compute instances 825, such as VMs) to customers. The compute resources 824 can, for example, be provided as a service to customers of a provider network 800 (e.g., to a customer that implements a customer network 850). Each computation resource 824 can be provided with one or more local IP addresses. The provider network 800 can be configured to route packets from the local IP addresses of the compute resources 824 to public Internet destinations, and from public Internet sources to the local IP addresses of the compute resources 824.

The provider network 800 can provide the customer network 850, for example coupled to an intermediate network 840 via a local network 856, the ability to implement virtual computing systems 892 via the hardware virtualization service 820 coupled to the intermediate network 840 and to the provider network 800. In some examples, the hardware virtualization service 820 can provide one or more APIs 802, for example a web services interface, via which the customer network 850 can access functionality provided by the hardware virtualization service 820, for example via a console 894 (e.g., a web-based application, standalone application, mobile application, etc.) of a customer device 890. In some examples, at the provider network 800, each virtual computing system 892 at the customer network 850 can correspond to a computation resource 824 that is leased, rented, or otherwise provided to the customer network 850.

From an instance of the virtual computing system(s) 892 and/or another customer device 890 (e.g., via console 894), the customer can access the functionality of a storage service 810, for example via the one or more APIs 802, to access data from and store data to storage resources 818A-818N of a virtual data store 816 (e.g., a folder or "bucket," a virtualized volume, a database, etc.) provided by the provider network 800. In some examples, a virtualized data store gateway (not shown) can be provided at the customer network 850 that can locally cache at least some data, for example frequently accessed or critical data, and that can communicate with the storage service 810 via one or more communications channels to upload new or modified data from a local cache so that the primary store of data (the virtualized data store 816) is maintained. In some examples, a user, via the virtual computing system 892 and/or another customer device 890, can mount and access virtual data store 816 volumes via the storage service 810 acting as a storage virtualization service, and these volumes can appear to the user as local (virtualized) storage 898.

While not shown in FIG. 8, the virtualization service(s) can also be accessed from resource instances within the provider network 800 via the API(s) 802. For example, a customer, appliance service provider, or other entity can access a virtualization service from within a respective virtual network on the provider network 800 via the API(s) 802 to request allocation of one or more resource instances within the virtual network or within another virtual network.

Illustrative Systems

Figure 9:
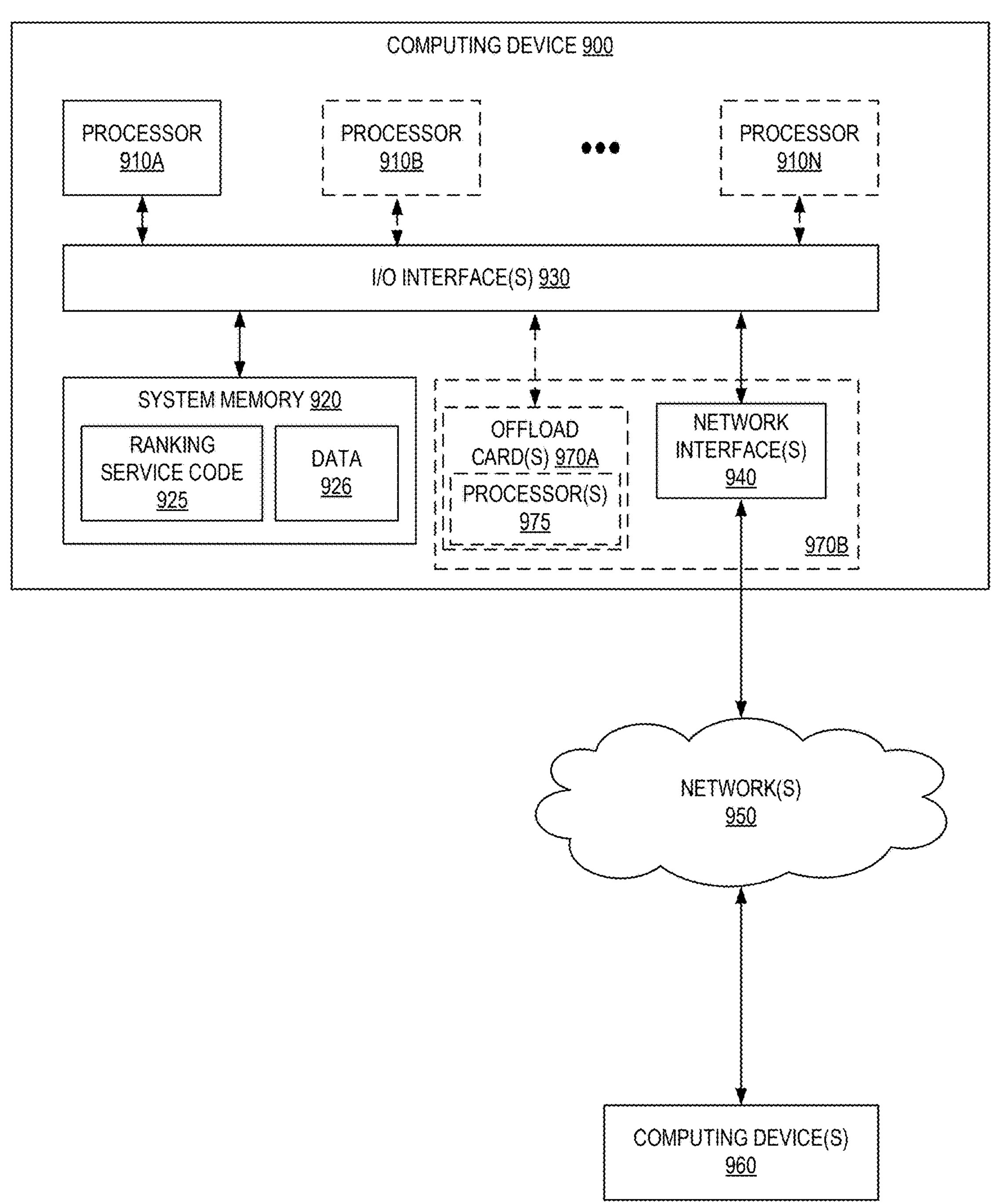
FIG. 9 is a block diagram illustrating an example computing device that can be used in some examples.

In some examples, a system that implements a portion or all of the techniques described herein can include a general-purpose computer system, such as the computing device 900 (also referred to as a computing system or electronic device) illustrated in FIG. 9, that includes, or is configured to access, one or more computer-accessible media. In the illustrated example, the computing device 900 includes one or more processors 910 coupled to a system memory 920 via an input/output (I/O) interface 930. The computing device 900 further includes a network interface 940 coupled to the I/O interface 930. While FIG. 9 shows the computing device 900 as a single computing device, in various examples the computing device 900 can include one computing device or any number of computing devices configured to work together as a single computing device 900.

In various examples, the computing device 900 can be a uniprocessor system including one processor 910, or a multiprocessor system including several processors 910 (e.g., two, four, eight, or another suitable number). The processor(s) 910 can be any suitable processor(s) capable of executing instructions. For example, in various examples, the processor(s) 910 can be general-purpose or embedded processors implementing any of a variety of instruction set architectures (ISAs), such as the x86, ARM, PowerPC, SPARC, or MIPS ISAs, or any other suitable ISA. In multiprocessor systems, each of the processors 910 can commonly, but not necessarily, implement the same ISA.

The system memory 920 can store instructions and data accessible by the processor(s) 910. In various examples, the system memory 920 can be implemented using any suitable memory technology, such as random-access memory (RAM), static RAM (SRAM), synchronous dynamic RAM (SDRAM), nonvolatile/Flash-type memory, or any other type of memory. In the illustrated example, program instructions and data implementing one or more desired functions, such as those methods, techniques, and data described above, are shown stored within the system memory 920 as ranking service code 925 (e.g., executable to implement, in whole or in part, the ranking service 121 or the constituent parts thereof) and data 926.

In some examples, the I/O interface 930 can be configured to coordinate I/O traffic between the processor 910, the system memory 920, and any peripheral devices in the device, including the network interface 940 and/or other peripheral interfaces (not shown). In some examples, the I/O interface 930 can perform any necessary protocol, timing, or other data transformations to convert data signals from one component (e.g., the system memory 920) into a format suitable for use by another component (e.g., the processor 910). In some examples, the I/O interface 930 can include support for devices attached through various types of peripheral buses, such as a variant of the Peripheral Component Interconnect (PCI) bus standard or the Universal Serial Bus (USB) standard, for example. In some examples, the function of the I/O interface 930 can be split into two or more separate components, such as a north bridge and a south bridge, for example. Also, in some examples, some or all of the functionality of the I/O interface 930, such as an interface to the system memory 920, can be incorporated directly into the processor 910.

The network interface 940 can be configured to allow data to be exchanged between the computing device 900 and other computing devices 960 attached to a network or networks 950, such as other computer systems or devices as illustrated in FIG. 1, for example. In various examples, the network interface 940 can support communication via any suitable wired or wireless general data networks, such as types of Ethernet network, for example. Additionally, the network interface 940 can support communication via telecommunications/telephony networks, such as analog voice networks or digital fiber communications networks, via storage area networks (SANs), such as Fibre Channel SANs, and/or via any other suitable type of network and/or protocol.

In some examples, the computing device 900 includes one or more offload cards 970A or 970B (including one or more processors 975, and possibly including the one or more network interfaces 940) that are connected using the I/O interface 930 (e.g., a bus implementing a version of the Peripheral Component Interconnect-Express (PCI-E) standard, or another interconnect such as a QuickPath interconnect (QPI) or UltraPath interconnect (UPI)). For example, in some examples the computing device 900 can act as a host electronic device (e.g., operating as part of a hardware virtualization service) that hosts compute resources such as compute instances, and the one or more offload cards 970A or 970B execute a virtualization manager that can manage compute instances that execute on the host electronic device. As an example, in some examples the offload card(s) 970A or 970B can perform compute instance management operations, such as pausing and/or un-pausing compute instances, launching and/or terminating compute instances, performing memory transfer/copying operations, etc. These management operations can, in some examples, be performed by the offload card(s) 970A or 970B in coordination with a hypervisor (e.g., upon a request from a hypervisor) that is executed by the other processors 910A-910N of the computing device 900. However, in some examples the virtualization manager implemented by the offload card(s) 970A or 970B can accommodate requests from other entities (e.g., from compute instances themselves), and cannot coordinate with (or service) any separate hypervisor.

In some examples, the system memory 920 can be one example of a computer-accessible medium configured to store program instructions and data as described above. However, in other examples, program instructions and/or data can be received, sent, or stored upon different types of computer-accessible media. Generally, a computer-accessible medium can include any non-transitory storage media or memory media such as magnetic or optical media, e.g., disk or DVD/CD coupled to the computing device 900 via the I/O interface 930. A non-transitory computer-accessible storage medium can also include any volatile or non-volatile media such as RAM (e.g., SDRAM, double data rate (DDR) SDRAM, SRAM, etc.), read only memory (ROM), etc., that can be included in some examples of the computing device 900 as the system memory 920 or another type of memory. Further, a computer-accessible medium can include transmission media or signals such as electrical, electromagnetic, or digital signals, conveyed via a communication medium such as a network and/or a wireless link, such as can be implemented via the network interface 940.

Various examples discussed or suggested herein can be implemented in a wide variety of operating environments, which in some cases can include one or more user computers, computing devices, or processing devices which can be used to operate any of a number of applications. User or client devices can include any of a number of general-purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and/or other devices capable of communicating via a network.

Most examples use at least one network that would be familiar to those skilled in the art for supporting communications using any of a variety of widely available protocols, such as Transmission Control Protocol/Internet Protocol (TCP/IP), File Transfer Protocol (FTP), Universal Plug and Play (UPnP), Network File System (NFS), Common Internet File System (CIFS), Extensible Messaging and Presence Protocol (XMPP), AppleTalk, etc. The network(s) can include, for example, a local area network (LAN), a wide-area network (WAN), a virtual private network (VPN), the Internet, an intranet, an extranet, a public switched telephone network (PSTN), an infrared network, a wireless network, and any combination thereof.

In examples using a web server, the web server can run any of a variety of server or mid-tier applications, including HTTP servers, File Transfer Protocol (FTP) servers, Common Gateway Interface (CGI) servers, data servers, Java servers, business application servers, etc. The server(s) also can be capable of executing programs or scripts in response requests from user devices, such as by executing one or more Web applications that can be implemented as one or more scripts or programs written in any programming language, such as Java®, C, C# or C++, or any scripting language, such as Perl, Python, PHP, or TCL, as well as combinations thereof. The server(s) can also include database servers, including without limitation those commercially available from Oracle®, Microsoft®, Sybase®, IBM®, etc. The database servers can be relational or non-relational (e.g., "NoSQL"), distributed or non-distributed, etc.

Environments disclosed herein can include a variety of data stores and other memory and storage media as discussed above. These can reside in a variety of locations, such as on a storage medium local to (and/or resident in) one or more of the computers or remote from any or all of the computers across the network. In a particular set of examples, the information can reside in a storage-area network (SAN) familiar to those skilled in the art. Similarly, any necessary files for performing the functions attributed to the computers, servers, or other network devices can be stored locally and/or remotely, as appropriate. Where a system includes computerized devices, each such device can include hardware elements that can be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system can also include one or more storage devices, such as disk drives, optical storage devices, and solid-state storage devices such as random-access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. It should be appreciated that alternate examples can have numerous variations from that described above. For example, customized hardware might also be used and/or particular elements might be implemented in hardware, software (including portable software, such as applets), or both. Further, connection to other computing devices such as network input/output devices can be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various examples.

In the preceding description, various examples are described. For purposes of explanation, specific configurations and details are set forth to provide a thorough understanding of the examples. However, it will also be apparent to one skilled in the art that the examples can be practiced without the specific details. Furthermore, well-known features can be omitted or simplified in order not to obscure the example being described.

Bracketed text and blocks with dashed borders (e.g., large dashes, small dashes, dot-dash, and dots) are used herein to illustrate optional aspects that add additional features to some examples. However, such notation should not be taken to mean that these are the only options or optional operations, and/or that blocks with solid borders are not optional in certain examples.

Reference numerals with suffix letters (e.g., 818A-818N) can be used to indicate that there can be one or multiple instances of the referenced entity in various examples, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters might or might not have the same number of instances in various examples.

References to "one example," "an example," etc., indicate that the example described may include a particular feature, structure, or characteristic, but every example may not necessarily include the particular feature, structure, or characteristic. Moreover, such phrases are not necessarily referring to the same example. Further, when a particular feature, structure, or characteristic is described in connection with an example, it is submitted that it is within the knowledge of one skilled in the art to affect such feature, structure, or characteristic in connection with other examples whether or not explicitly described.

Moreover, in the various examples described above, unless specifically noted otherwise, disjunctive language such as the phrase "at least one of A, B, or C" is intended to be understood to mean either A, B, or C, or any combination thereof (e.g., A, B, and/or C). Similarly, language such as "at least one or more of A, B, and C" (or "one or more of A, B, and C") is intended to be understood to mean A, B, or C, or any combination thereof (e.g., A, B, and/or C). As such, disjunctive language is not intended to, nor should it be understood to, imply that a given example requires at least one of A, at least one of B, and at least one of C to each be present.

As used herein, the term "based on" (or similar) is an open-ended term used to describe one or more factors that affect a determination or other action. It is to be understood that this term does not foreclose additional factors that may affect a determination or action. For example, a determination may be solely based on the factor(s) listed or based on the factor(s) and one or more additional factors. Thus, if an action A is "based on" B, it is to be understood that B is one factor that affects action A, but this does not foreclose the action from also being based on one or multiple other factors, such as factor C. However, in some instances, action A may be based entirely on B.

Unless otherwise explicitly stated, articles such as "a" or "an" should generally be interpreted to include one or multiple described items. Accordingly, phrases such as "a device configured to" or "a computing device" are intended to include one or multiple recited devices. Such one or more recited devices can be collectively configured to carry out the stated operations. For example, "a processor configured to carry out operations A, B, and C" can include a first processor configured to carry out operation A working in conjunction with a second processor configured to carry out operations B and C, where the second processor could be part of same computing device as the first processor or part of a separate computing device as the first processor.

Further, the words "may" or "can" are used in a permissive sense (i.e., meaning having the potential to), rather than the mandatory sense (i.e., meaning must). The words "include," "including," and "includes" are used to indicate open-ended relationships and therefore mean including, but not limited to. Similarly, the words "have," "having," and "has" also indicate open-ended relationships, and thus mean having, but not limited to. The terms "first," "second," "third," and so forth as used herein are used as labels for the nouns that they precede, and do not imply any type of ordering (e.g., spatial, temporal, logical, etc.) unless such an ordering is otherwise explicitly indicated. Similarly, the values of such numeric labels are generally not used to indicate a required amount of a particular noun in the claims recited herein, and thus a "fifth" element generally does not imply the existence of four other elements unless those elements are explicitly included in the claim or it is otherwise made abundantly clear that they exist.

The specification and drawings are, accordingly, to be regarded in an illustrative rather than a restrictive sense. It will, however, be evident that various modifications and changes can be made thereunto without departing from the broader scope of the disclosure as set forth in the claims.

What is claimed is:

1. A computer-implemented method comprising:

receiving a request to predict text; and generating, by a ranking service implemented as ranking service code executed by one or more processors, a predicted text output, wherein the predicted text output is selected from a plurality of predicted texts generated in response to the request, and wherein the generating comprises:

predicting a plurality of predicted texts using at least one machine learning model, multi-dimensionally scoring, by the ranking service, each of the plurality of predicted texts by computing a first score using stability scoring, computing a second score using entailment scoring in which a Natural Language Inference (NLI) model is used to quantify an entailment relation of a first one of the predicted texts to a second one of the predicted texts, and computing a third score using inter-sample uncertainty scoring, computing a composite score for each of the plurality of predicted texts from the first score, the second score, and the third score, ranking the plurality of predicted texts based at least in part the composite scores, and selecting at least a highest ranked predicted text of the plurality of predicted texts as the predicted text output; and outputting the at least the highest ranked predicted text of the plurality of predicted texts as the predicted text output.

2. The computer-implemented method of claim 1, wherein the request is to generate a textual summary.

3. The computer-implemented method of claim 1, wherein the request includes at least one of text, audio, or video to predict text from.

4. A computer-implemented method comprising:

receiving a request to predict text; and generating, by a ranking service implemented as ranking service code executed by one or more processors, a predicted text output, wherein the predicted text output is selected from a plurality of predicted texts generated in response to the request, and wherein the generating comprises:

predicting a plurality of predicted texts using at least one machine learning model, scoring, by the ranking service, each of the plurality of predicted texts by computing a first score using intra-sample scoring, computing a second score using entailment scoring in which a Natural Language Inference (NLI) model is used to quantify an entailment relation of a first one of the predicted texts to a second one of the predicted texts, and computing a third score using inter-sample scoring, computing a composite score for each of the plurality of predicted texts from the first score, the second score, and the third score, ranking the plurality of predicted texts based at least in part the composite scores, and selecting at least a highest ranked predicted text of the plurality of predicted texts as the predicted text output.

5. The computer-implemented method of claim 4, wherein the predicting a plurality of predicted texts using at least one machine learning model comprises using a single machine learning model a plurality of times and different outputs of the machine learning model, wherein the different outputs are generated based at least in part on one or more of sampling, greedy decoding, or temperature changing.

6. The computer-implemented method of claim 4, wherein the predicting a plurality of predicted texts using at least one machine learning model comprises using a plurality of machine learning models to generate different output.

7. The computer-implemented method of claim 4, wherein the intra-sample scoring comprises generating a score for each of the plurality of predicted texts based on semantic stability.

8. The computer-implemented method of claim 4, wherein the intra-sample scoring comprises generating a score for each of the plurality of predicted texts based on entailment.

9. The computer-implemented method of claim 8, wherein entailment scoring includes using a generative large language model or a natural language interference model.

10. The computer-implemented method of claim 4, wherein the inter-sample scoring comprises generating a score for each of the plurality of predicted texts based on uncertainty sampling.

11. The computer-implemented method of claim 4, wherein the computing a composite score for each of the plurality of predicted texts from the first score, the second score, and the third score comprises calculating a weighted score for each of the plurality of predicted texts from the first score, the second score, and the third score.

12. The computer-implemented method of claim 4, wherein the request to predict text includes an image.

13. The computer-implemented method of claim 4, wherein the request to predict text includes text.

14. The computer-implemented method of claim 4, wherein the request to predict text includes audio.

15. A system comprising:

a first one or more computing devices to implement a text generation service in a multi-tenant provider network; and a second one or more computing devices to implement a ranking service in the multi-tenant provider network, the ranking service implemented as ranking service code that upon execution by one or more processors causes the ranking service to:

generate a predicted text output from output of the text generation service, wherein the predicted text output is selected from a plurality of predicted texts, wherein to generate comprises to:

predict a plurality of predicted texts using at least one machine learning model, score, by the ranking service, each of the plurality of predicted texts by computing a first score using intra-sample scoring, computing a second score using entailment scoring in which a Natural Language Inference (NLI) model is used to quantify an entailment relation of a first one of the predicted texts to a second one of the predicted texts, and computing a third score using inter-sample scoring, compute a composite score for each of the plurality of predicted texts from the first score, the second score, and the third score, rank the plurality of predicted texts based at least in part the composite scores, and select at least a highest ranked predicted text of the plurality of predicted texts as the predicted text output.

16. The system of claim 15, wherein the text generation service is a speech-to-text service.

17. The system of claim 15, wherein the text generation service is a natural language processing service.

18. The system of claim 15, wherein the text generation service is a business intelligence service.

19. The system of claim 15, wherein to predict a plurality of predicted texts using at least one machine learning model comprises to use a single machine learning model a plurality of times and different outputs of the machine learning model, wherein the different outputs are generated based at least in part on one or more of sampling, greedy decoding, or temperature changing.

20. The system of claim 15, wherein to predict a plurality of predicted texts using at least one machine learning model comprises to use a plurality of machine learning models to generate different output.

* * * * *